United States Patent [19]
Willis

[11] Patent Number: 6,029,648
[45] Date of Patent: Feb. 29, 2000

[54] OUTSIDE WOOD-BURNING FURNACE

[76] Inventor: W. Coy Willis, Apollo Engineering, 22161 Stipps Hill Rd., Laurel, Ind. 47024

[21] Appl. No.: 08/995,143

[22] Filed: Dec. 29, 1997

[51] Int. Cl.[7] .............................. F24D 9/00; F23M 7/00; F23M 7/04; G05D 23/12

[52] U.S. Cl. ..................... 126/101; 126/197; 126/285 R; 110/173 R; 110/175 R; 122/498; 236/99 R

[58] Field of Search .................................. 126/101, 293, 126/197, 285 R, 190; 122/15, 498; 110/173 R, 174, 176, 178, 175 R; 236/99 R, 99 F, 99 H

[56] References Cited

U.S. PATENT DOCUMENTS

| | | | |
|---|---|---|---|
| 1,989,105 | 1/1935 | Miles | 236/99 F |
| 3,599,865 | 8/1971 | Kristiansen | 236/99 |
| 3,976,245 | 8/1976 | Cole | 236/93 A |
| 4,145,259 | 3/1979 | Leumann | 202/248 |
| 4,360,152 | 11/1982 | Schlatter et al. | 237/13 |
| 4,383,519 | 5/1983 | Katona | 126/190 |
| 4,418,649 | 12/1983 | Purvis | 122/15 |
| 4,461,242 | 7/1984 | Black | 122/15 |
| 4,461,243 | 7/1984 | Carpaneto | 122/15 |
| 4,479,605 | 10/1984 | Billotte et al. | 237/8 R |
| 4,497,262 | 2/1985 | Nordine | 110/234 |
| 4,612,878 | 9/1986 | Schnurer | 122/15 |
| 4,724,798 | 2/1988 | Alspaugh | 122/15 |
| 4,779,795 | 10/1988 | Winmill | 237/51 |
| 5,329,920 | 7/1994 | Brazier | 126/344 |
| 5,377,661 | 1/1995 | Farver | 126/101 |

*Primary Examiner*—Ira S. Lazarus
*Assistant Examiner*—David Lee
*Attorney, Agent, or Firm*—David W. Brownlee; Eckert Seamans Cherin & Mellott, LLC

[57] ABSTRACT

A natural draft furnace has a firebox inside a water box with fire tubes containing water running through the firebox, flues from the firebox running through the water box, a front/fire door of double wall construction to preheat entering air, a damper in the fire door and a toggle-lock latching system on the fire door that provides uniform sealing pressure around the door.

19 Claims, 11 Drawing Sheets

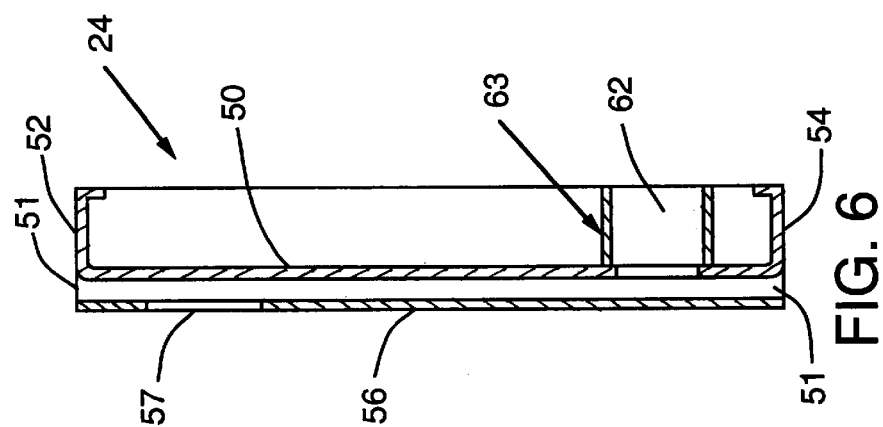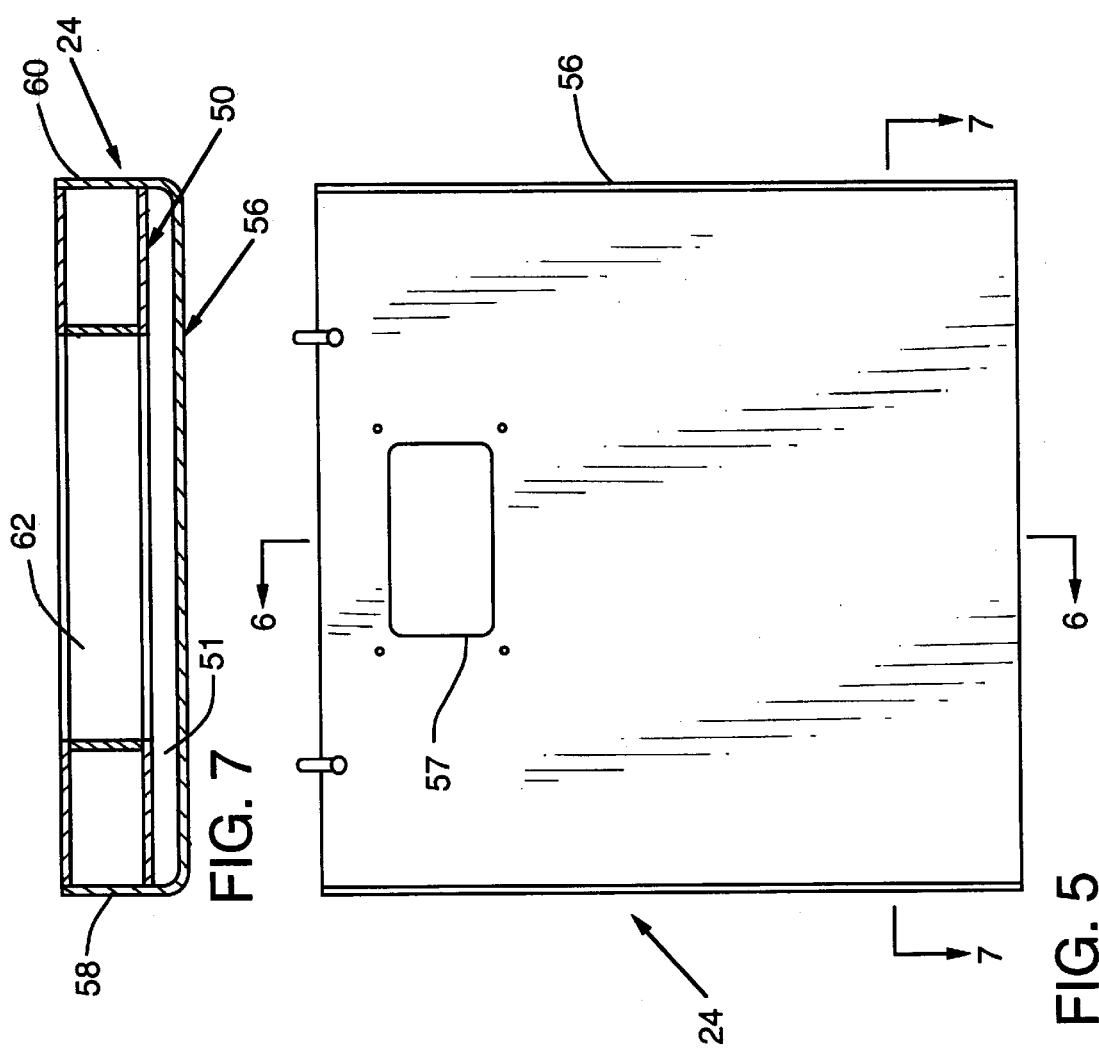

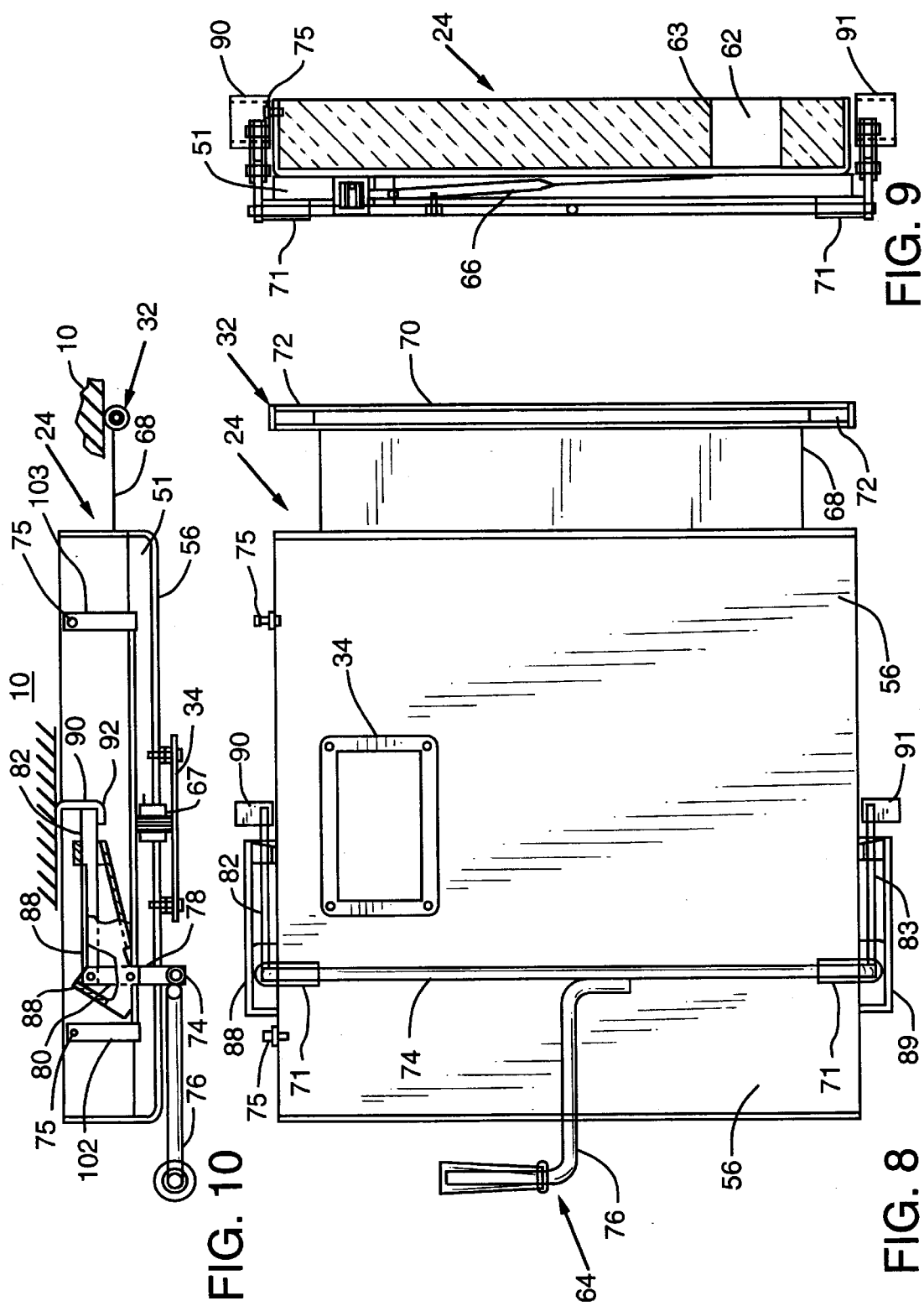

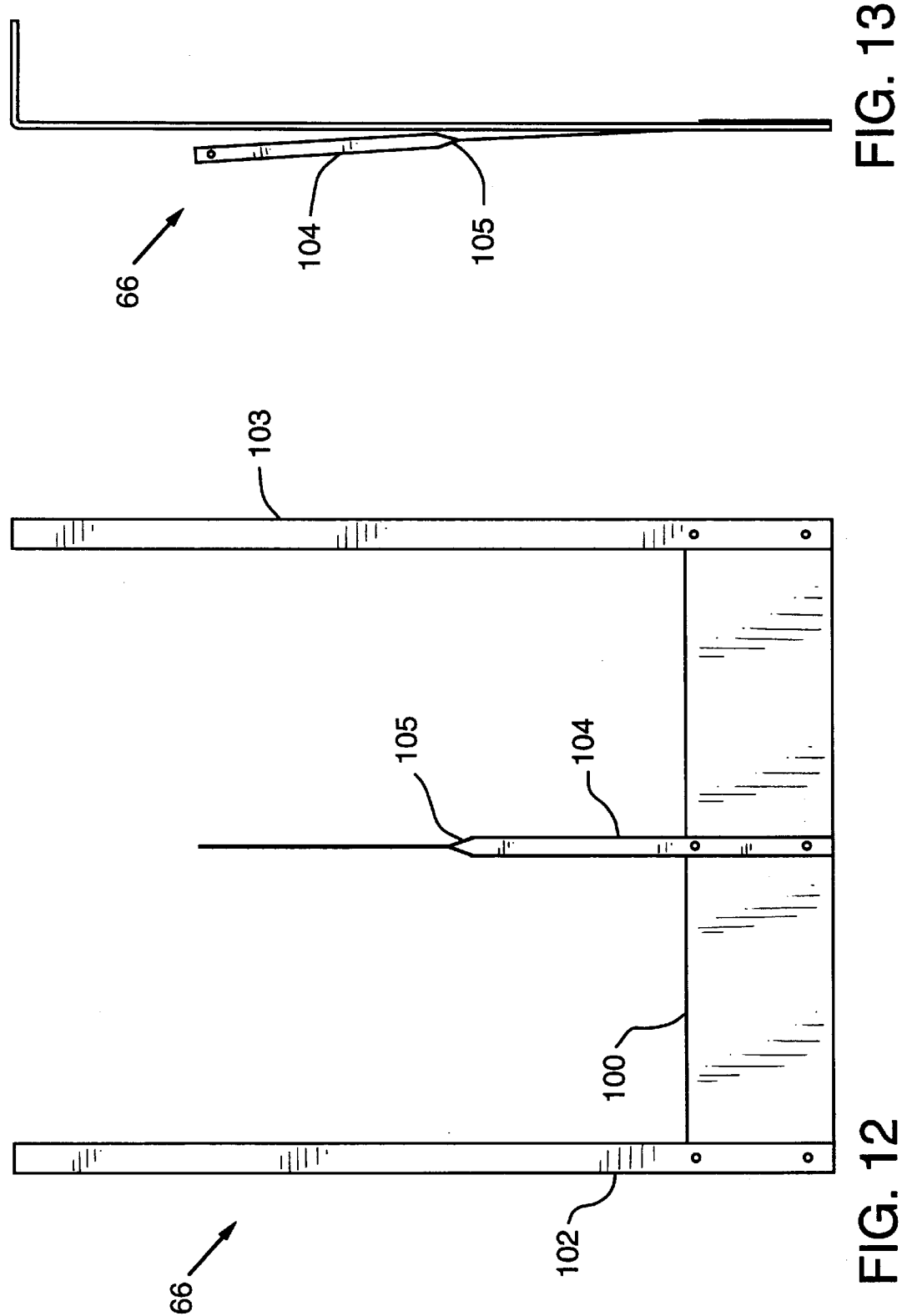

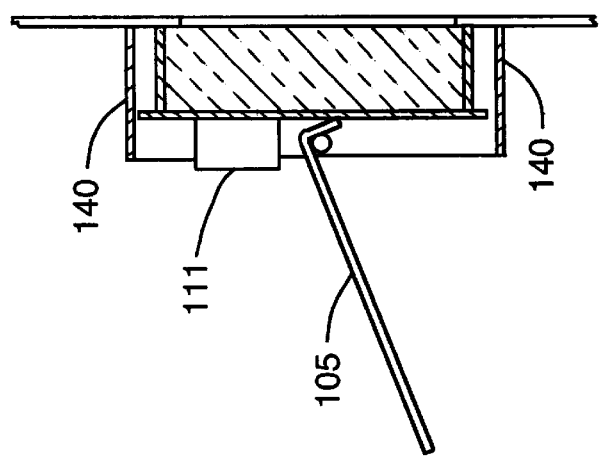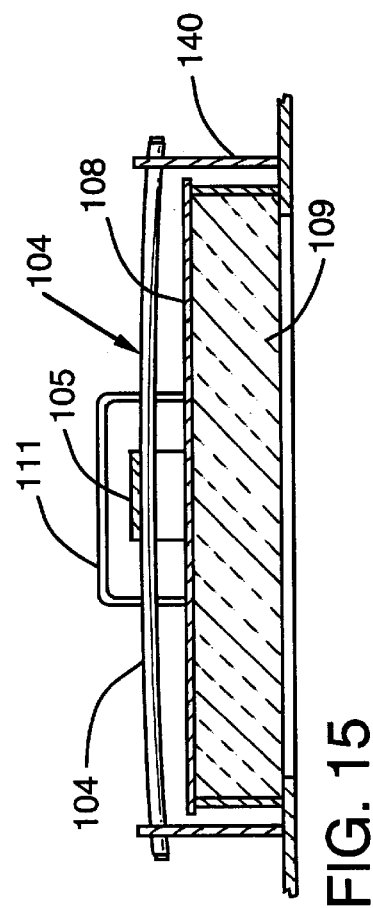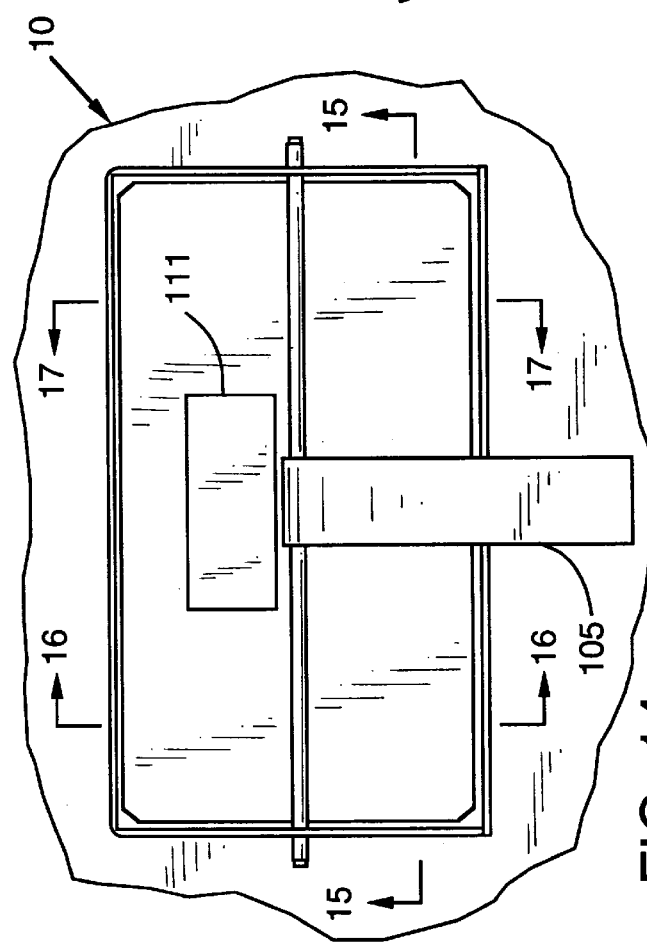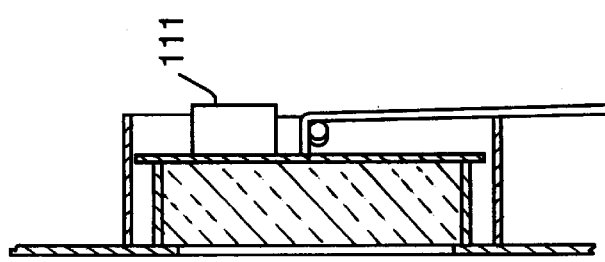

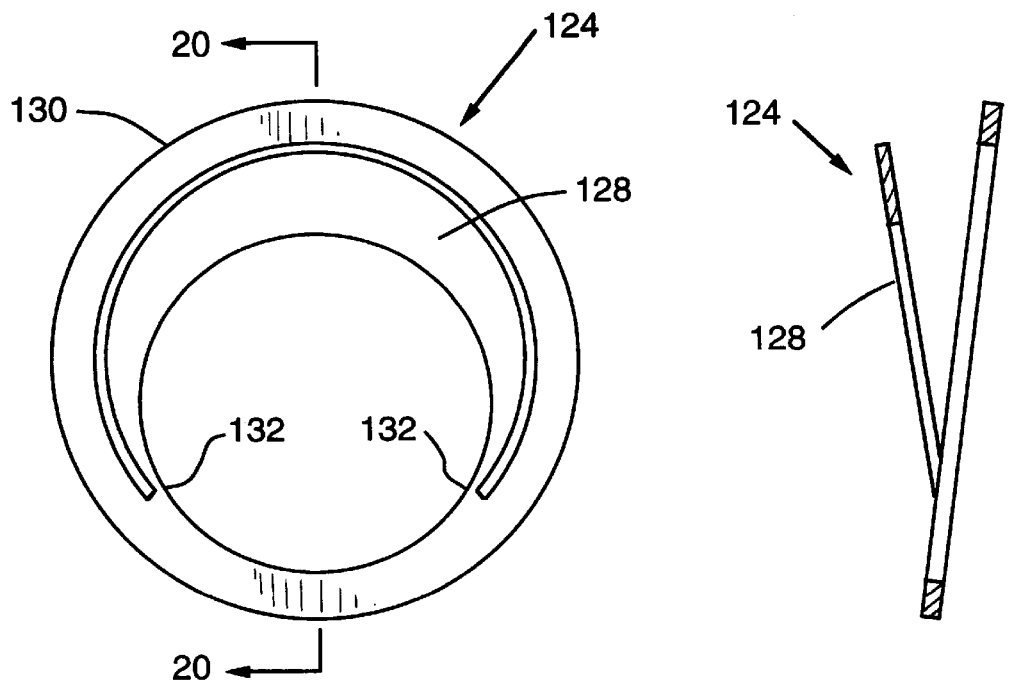
FIG. 19
FIG. 20
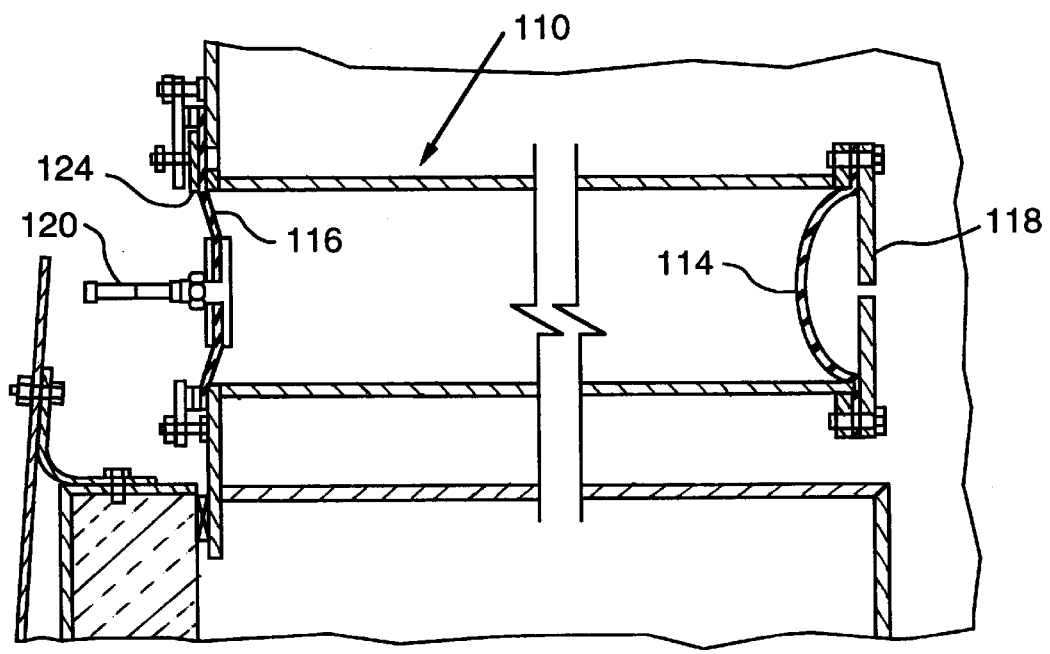
FIG. 22

OUTSIDE WOOD-BURNING FURNACE

BACKGROUND OF THE INVENTION

1. Field of the Invention

This invention relates to furnaces for heating homes, garages, shops, grain dryers and the like and particularly to a type of furnace generally referred to as "outside wood-burning furnaces". Although called outside wood-burning furnaces, they are sometimes placed inside buildings and many also burn fuels other than wood. The furnace of this invention is best suited for using water as a heating and heat storage medium. Hot water is circulated from the furnace to remote areas where heat is extracted by some form of heat exchanger.

2. Description of the Prior Art

Outside wood-burning furnaces are commonly used throughout the United States, Canada and other countries in rural areas where there is an abundant supply of wood. The furnaces are used to heat homes, shops, barns, garages, swimming pools, hot tubs, clothes dryers, hot water heaters, grain dryers and other buildings and devices. Since the furnaces are typically located outside the home, they avoid the need to carry firewood into the home or remove ashes from the home. They also avoid the sooty messes in the home that sometimes occur with wood burning furnaces, avoid obnoxious smells and possibly dangerous gases that occasionally come from wood-burning furnaces, and avoid annoying insects that may be brought into the home with firewood. They also avoid the possibility of damaging fires to homes.

Outside wood-burning furnaces are sometimes housed in small utility buildings or can include shielding to protect the furnaces from the elements. They may also be located inside other buildings such as barns or garages.

Although outside wood-burning furnaces have been in use for many years, the furnaces leave much to be desired in the terms of performance, convenience, appearance and cost. There is a need for an improved outside wood-burning furnace having improved performance and reliability and which can be manufactured by modern manufacturing methods. An outside wood-burning furnace is needed which is safe and convenient to operate and which strikes a good balance between cost, efficiency, and cleaning convenience. Such a furnace also needs to be attractive from all points of view.

SUMMARY OF THE INVENTION

This invention provides an outside, natural draft combustion, wood-burning furnace that satisfies the need for improved performance, convenience and appearance at a reasonable cost. The furnace is well suited to be manufactured in volume using modern manufacturing methods. Given sufficient quantities of production runs, the furnace can be manufactured at low cost and high quality. The furnace is also safe and convenient to operate and can be operated with or without electrical power. The furnace is attractive from all points of view and the design permits the customer to select different color schemes. The furnace is designed with the consumer in mind.

The furnace of the invention has a greatly improved fire door which applies uniform sealing pressure of the sealing gasket against the fire box around the complete perimeter of the door and includes a toggle-lock latching system. The door is connected to the furnace through a hinge pin which is spaced from one lateral edge of the door, and the locking latch system uses a flexible outer wall of the double wall door and flexible hinge construction to act as a spring to hold the door against the fire box. The locking pressure is applied in the center of the door rather than at one side.

The double wall fire door of the invention also includes a self-cooling, energy saving, air preheating, vertical draft chamber between the hot inner side of the door and cooler outside surface of the door. A preferred embodiment further includes an automatic fail-safe damper that shuts off the air in the event of a power failure to prevent overheating and boiling the water from the furnace. The damper can be manually operated if necessary.

A furnace of this invention includes cross-fire tubes that are suspended inside the fire box above the fire where the flames and flue gases must filter past the tubes on their way out of the fire box. This direct contact of hot gases with fire tubes transfer the heat energy from the hot gases directly into the water in the water box of the furnace.

A furnace of this invention further preferably includes two horizontal flue pipes that are surrounded by water in the water box to extract additional heat from the flue gases before the gases are exhausted from the furnace. These pipes extend almost the entire length of the furnace and provide considerable surface area for heating the water in the water box.

Another preferred feature of this invention is a rear service door to provide access to all internal flue systems for inspection, cleaning and servicing.

To ensure that heat stays where it should, the entire furnace is surrounded by heat-saver insulation blankets to minimize heat loss. The furnace is preferably wrapped in about two inches of closed cell foam having a high R-value. Both doors are filled with light-weight insulating refractory cement. Precoated sheet metal roof, side walls, front wall and rear wall are positioned over the foam insulation for protection from the elements and to provide a pleasing appearance for the furnace. The laminated side panels are easily removable to permit convenient choice of colors during or after manufacture of a furnace.

A furnace of this invention can include dampers which are operated either electrically, manually or hydrostatically. One embodiment includes a hydrostatic thermostat which is operated by changes in the volume of water in a water filled conduit or tube that is located in the furnace. This embodiment is particularly well suited for furnaces used in remote locations where electrical power is not readily available and also for use by religious sects that do not use electricity.

It is therefore seen that a furnace of this invention offers many improvements and advantages for the user.

Accordingly, an object of this invention is to provide an outside woodburning furnace which has improved performance, convenience, safety, and appearance at reasonable cost.

The above and other objects and advantages of this invention will be more fully understood and appreciated with reference to the attached drawings and the following description.

BRIEF DESCRIPTION OF THE DRAWINGS

FIG. 5 is a front elevation of the fire door for the furnace of FIGS. 1–3 before the damper, solenoid, name plate and latch locking mechanism have been mounted to the door.

FIG. 6 is a cross-sectional view of the fire door of FIG. 5 taken on line 6—6 in FIG. 5.

FIG. 7 is a cross-sectional view of the fire door of FIGS. 5 and 6 taken along line 7—7 in FIG. 5.

FIGS. 8 and 9 are similar to FIGS. 5 and 6 and further showing a preferred toggle-latch locking mechanism, damper, solenoid and name plate mounted on the door.

FIG. 10 is a top view of the door assembly of FIGS. 8 and 9.

FIG. 12 is a plan view of the damper in the door of FIGS. 8–10.

FIG. 13 is a side elevation of the damper of FIG. 12.

FIG. 14 is a vertical plan view of a rear door on the furnace of this invention.

FIG. 15 is a cross-section through the door of FIG. 14 taken on line 15—15 with the door locked on the furnace.

FIG. 16 is a cross-section of the door of FIGS. 14 and 15 taken along line 16—16.

FIG. 17 is a cross-section of the door of FIGS. 14–16 taken along line 17—17 and showing the door unlocked on the furnace.

FIG. 19 is a plan view of a burp valve plate used in the thermostat of FIG. 18.

FIG. 20 is a cross-section through the burp valve plate of FIG. 19 taken along line 20—20.

FIG. 22 is a vertical cross-section similar to FIGS. 18 and 21 and showing the thermostat in the cold mode with the damper in the open position.

DESCRIPTION OF THE PREFERRED EMBODIMENTS

Figure 1:
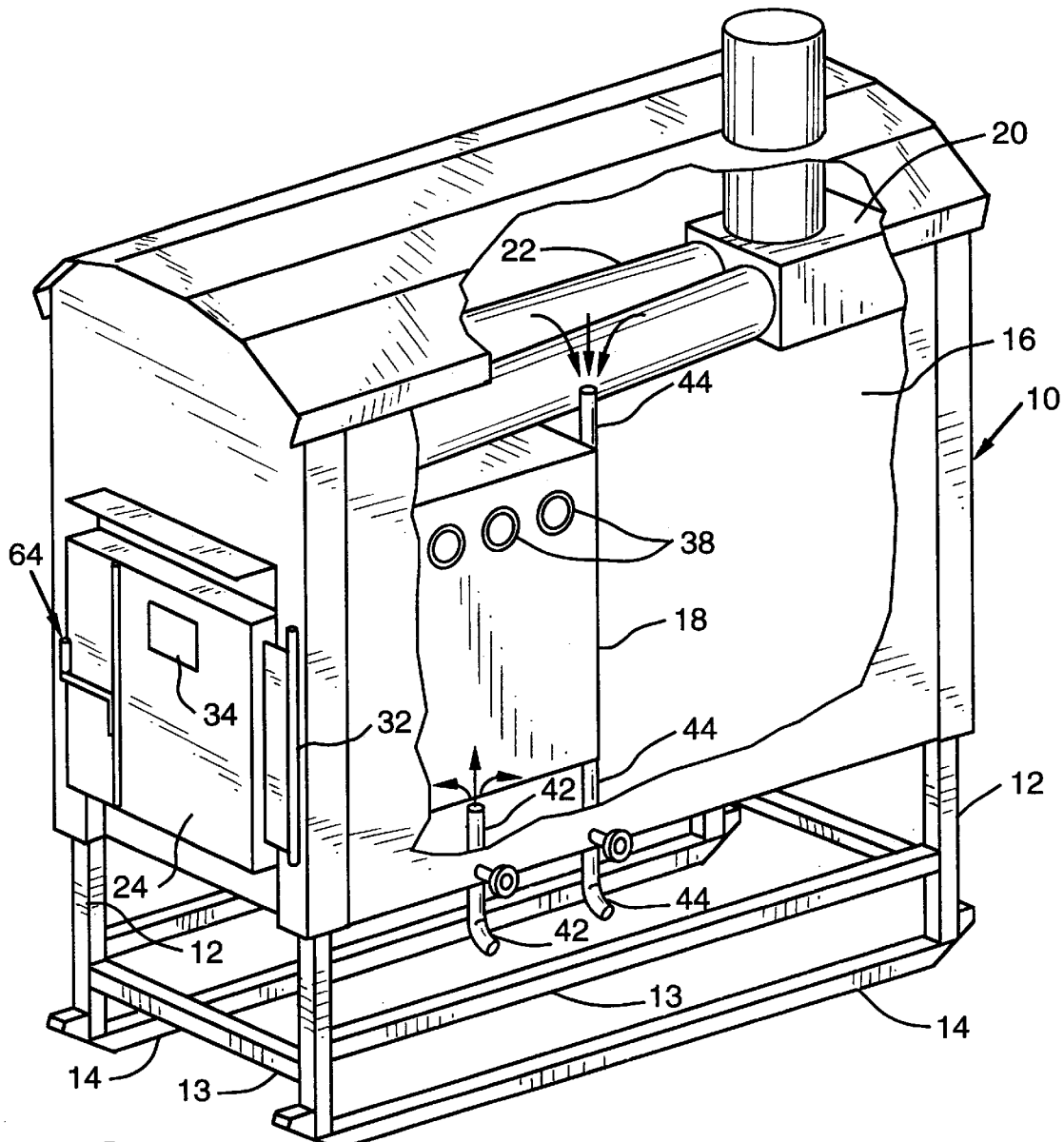
FIG. 1 is a perspective view of a furnace of this invention in partial fragmentary to show a portion of the inside of the furnace.

The drawings show an outside wood-burning stove which is made mostly of sheet metal such as sheet steel that is assembled primarily by welding. The steel sheet material may be 10, 12, 14 gauge for different parts depending on the size and strength requirements for the part. Other parts may be made of stainless steel or aluminum. Various other materials and methods of interconnection will be described where appropriate.

The term outside wood-burning furnace is used in the broad sense to describe the type of furnace and not to limit it to outside locations nor to the use of wood as fuel. The furnace may be located inside a building and can burn other fuels such as coal, gas or fuel oil.

Referring first to FIGS. 1–4, a preferred embodiment of a furnace 10 of this invention is shown as mounted on a main body assembly having a frame of legs 12, braces 13 and skids or support rails 14 made of rectangular steel tubing on which the furnace is supported. The furnace is adapted to be slid or dragged from place to place on the support rails 14.

The furnace includes insulated sheet metal side walls, a front outside wall and rear outside wall and roof which are preferably made of colored plastic sheet material with approximately 2 inches of urethane foam insulation laminated to the interior faces of the plastic sheet material. The walls are designed to be easily removed for interchangeability of colors on the furnace.

The furnace 10 includes a water box assembly 16, a fire box assembly 18, a smoke or flue box assembly 20, a pair of substantially horizontal flues 22 connecting the fire box to the flue box, a front door assembly 24, a rear door assembly 26 (FIGS. 14–17), optional copper tubing 28 in the water box, and various plumbing connections for water flow into the water box assembly and for water flow through the copper tubing. The front door assembly 24 in the preferred embodiment includes a toggle locking mechanism 64, a damper assembly 66 (FIGS. 12 and 13), a name plate 34 and a solenoid mechanism 67 (FIG. 10) for operating the damper as will be described. The front door assembly 24 has a special double wall design with a vertical air passage between the two walls for natural draft, fresh air to flow through and into the fire box 18 to support combustion.

The water box assembly 16 is preferably made of sheet steel welded together with a heavy weld, water tight, at all seams from the inside of the tank. As the name implies, the water box 16 is designed to be substantially filled with water which is heated by combustion in the fire box 18 assembly which is located centrally in one end of the water box. The fire box assembly 18 is also made of sheet steel which is heavy welded, water-tight at the seams and welded into a rectangular opening at one end of the water box. The fire box 18 is supported in the water box 16 by a support strap, not shown, so the fire box is surrounded by water in the water box except at the fire door 24.

The fire box assembly 18 has a plurality of fire tubes 38 extending horizontally through it adjacent the top of the fire box. The fire tubes 38 are preferably open on both ends for water from the water box 16 to flow through the fire tubes. The fire tubes 38 are welded, water-tight, into both side walls of the fire box 20 and are preferably sloped slightly (about 5°) to horizontal to create a thermal gradient of water in the tubes and cause a natural flow of water therethrough as a result of such thermal gradient. The fire box 18 has an open end where the fire box is welded to the water box 16 and where the front (fire) door 24 is located.

The two flues 22 are welded at one end of each of the top of the fire box 18 which has openings in it corresponding to the open ends of the flues 22. The flues extend generally horizontally at an upward slope at about 1–5° from the fire box 18 to the flue box assembly 20 and are welded to an end wall of the flue box assembly at openings therein corresponding to the open ends of the flues. The slope of the flues 22 is desirable so any creosote or water that may collect in the flues or the flue box 20 will drain into the fire box 18.

The flue/smoke box assembly 20 is welded to the rear wall of the water box assembly 16 at an opening in the water box corresponding in size to the flue box. The flue box 20 has a similar opening in its rear wall for access from the outside of the furnace into the flue box. A rear door assembly 26 (FIGS. 14–17) closes the opening into the flue box 20.

The flue box 20 further has an opening in its top wall and has a flue pipe 40 inserted into the opening and welded to it around the full perimeter of the opening and the flue pipe. The flue pipe 40 extends upwardly through the roof of the furnace for exhaust of combustion gases to the outside. A flue pipe extension can be added on the top of the flue pipe 40 to increase the height of the exhaust and increase the draft through the furnace.

Figure 4:
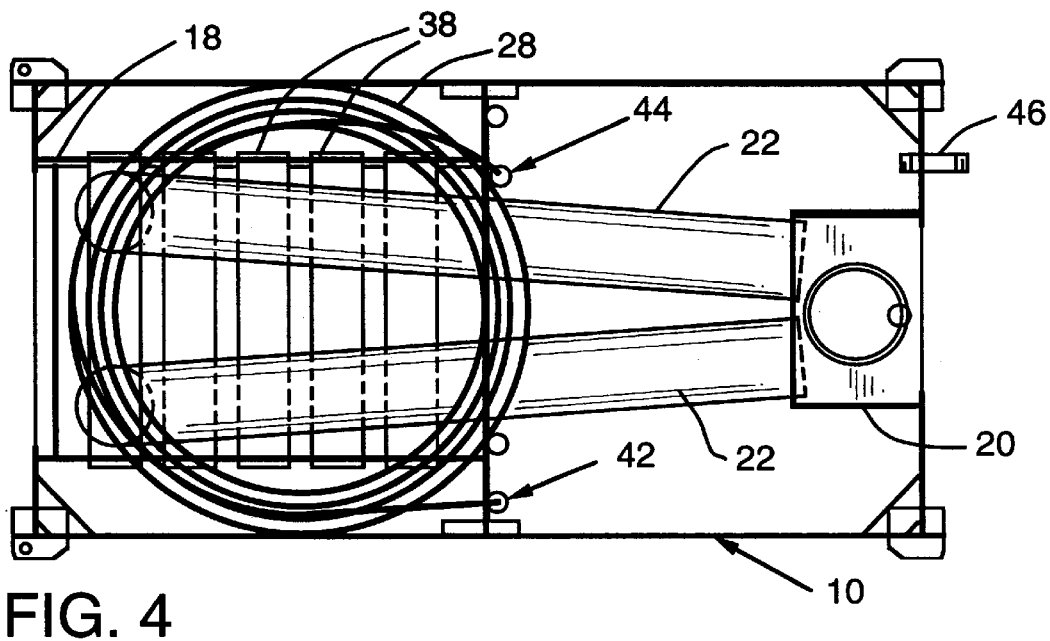
FIG. 4 is a top plan view of the furnace of FIGS. 1 and 2 with the roof and top panel of the furnace removed to show the inside of the furnace.
Figure 3:
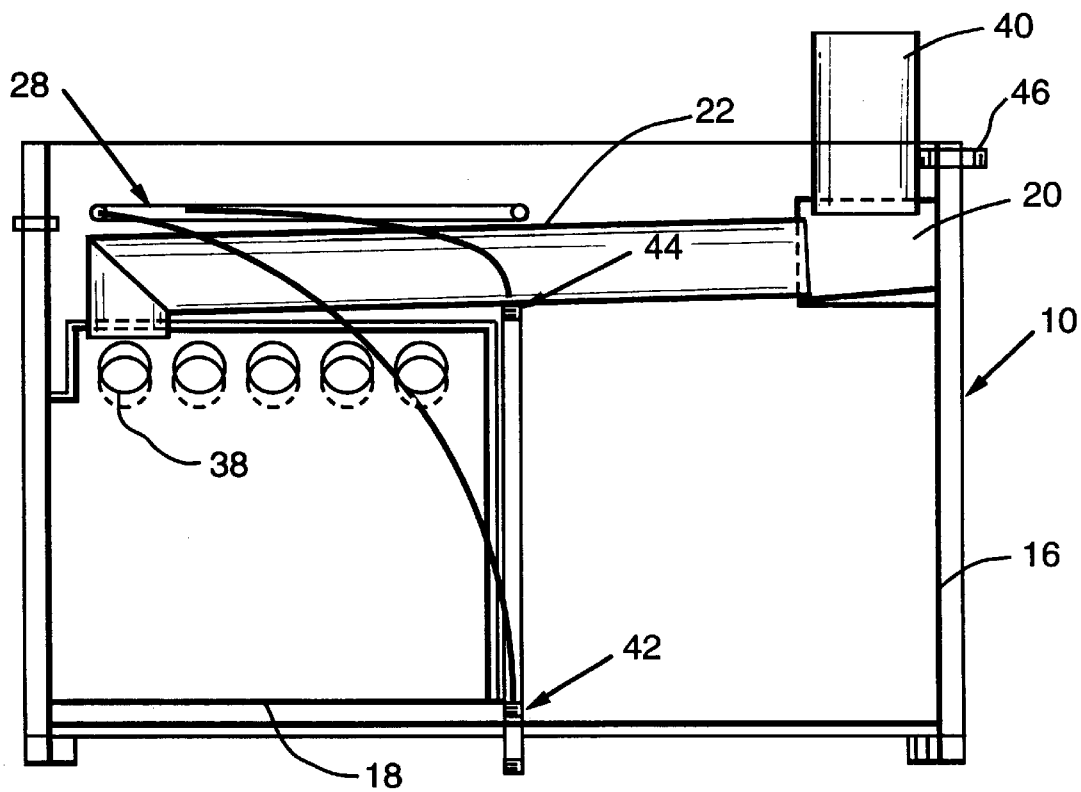
FIG. 3 is a vertical cross-section through the furnace of FIG. 1, taken along the centerline of the furnace front to rear.

As best shown in FIGS. 3 and 4, the furnace 10 may optionally include soft copper tubing 28 for circulation of water through the furnace for heat transfer from the water in the water box 16 to water in the copper tubing. The tubing 28 may be connected to vertical inlet and outlet water pipes 42 and 44 adjacent the rear of the fire box 18. The pipes 42, 44 extend through the bottom wall of the water box 16 and have fitments on them for connection to tubing, pipes or the like for water flow to a domestic (home) water heater. The furnace 10 preferably has a second set of inlet and outlet pipes and connections, not shown, to the water box for water flow to and from heat transfer apparatus at a building or apparatus to be heated by the furnace. In the preferred embodiment both inlet pipes are relatively short and extend only a short distance above the bottom of the furnace and the outlet pipes are longer and extend to about the height of the fire box 16 or slightly above the top of the fire box so the hot water near the top of the water box 16 is delivered to the heat exchanger and the spent (cold) water is returned to the bottom of the water box in a manner similar to a domestic hot water heater.

The furnace 10 has a front outside wall, rear outside wall, side skins and roof made of pre-coated sheet metal or polymer plastic material which is corrosion resistant and protects the furnace from the elements. The furnace has insulation located between the water box and the skin of the furnace to minimize heat loss from the furnace. The insulation is preferably closed-cell urethane foam, about two inches thick having a high R-value. As stated above, the walls, side skins and roof of the furnace can be easily removed and replaced.

The water box 16 further has a fill/vent opening 46 in its rear wall and a suitable valve opening (not shown) for draining water from the box. As a safety measure, the opening 46 cannot be closed since the vent must remain open to avoid pressure build-up in the water box and avoid any risk of explosion of the furnace. Water circulates in the water box as a result of the natural convection as it is heated through the fire tubes 38 and flue pipes 22 and by the walls of the fire box 18. This natural convection enhances heat transfer from the fire box 18 to the water in the water box 16. Antifreeze and/or other additives can be put into the water in the water box 16 to prevent freezing of the water in the water box when the furnace is not in operation and prevent corrosion of the inside of the water box and outside surfaces of the fire box 18, flue box 20, and flues 22.

Figure 2:
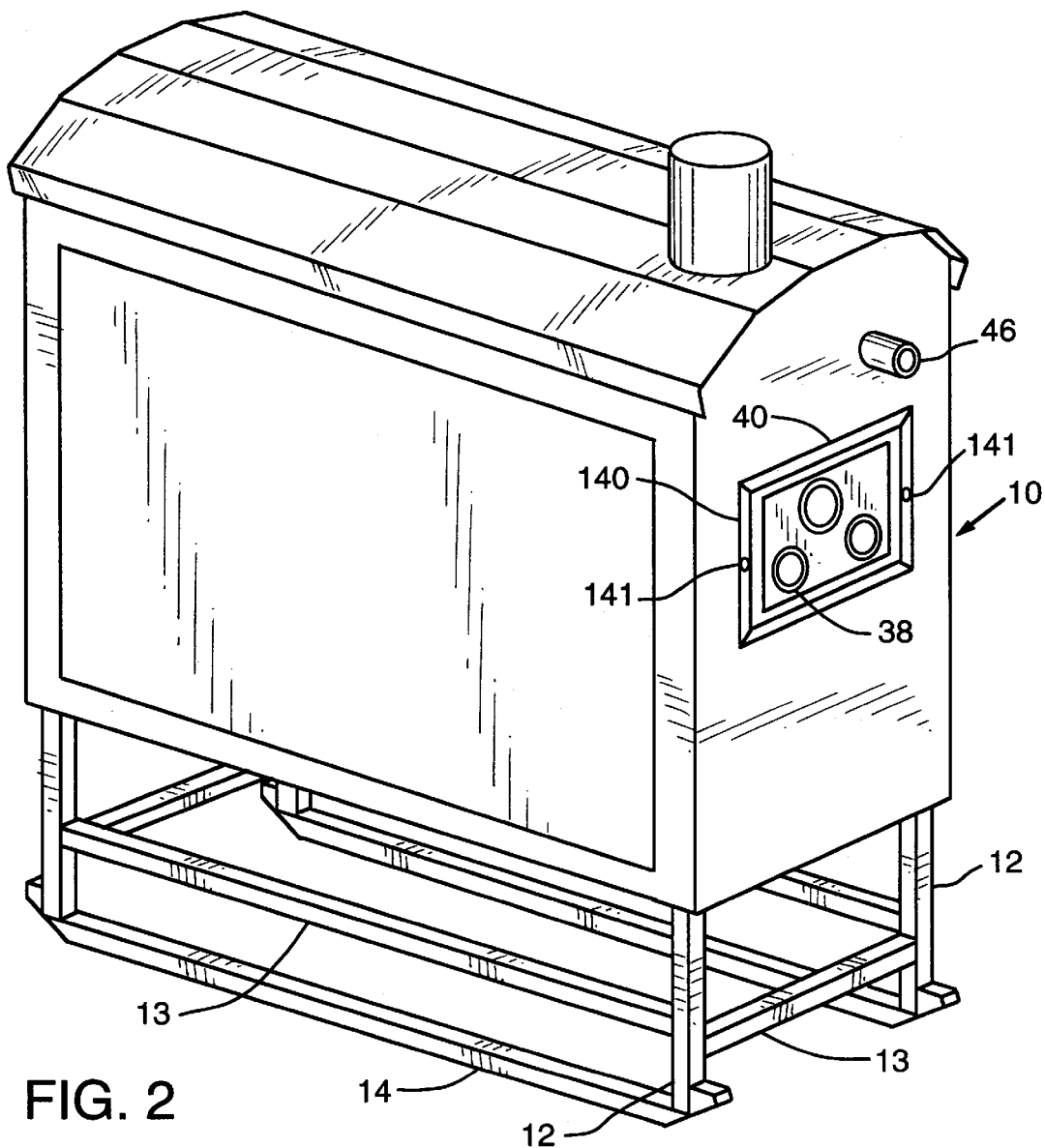
FIG. 2 is a perspective view of the rear and one side of the furnace of FIG. 1.

The rear opening into the flue box 20 in the furnace 10 is best seen in FIG. 2. This opening provides access to the inside of the flue box 20 for inspection, cleaning and servicing the flue box, the horizontal flues 22 and the flue pipe 40. The rear door assembly 26 (FIGS. 14–17) is preferably not hinged or otherwise connected to the furnace except with a removable latch that secures the door in place. The rear door is preferably made of stainless steel and is filled with insulating cement to minimize heat loss through the door.

It is a feature of this invention that the front door 24 to the fire box 18 in the furnace 10 is a double wall construction that forms a vertical air passage for fresh air to enter the fire box. It is a further feature that the door has a fail safe damper mounted in it that shuts off air flow in the event of a power failure. Still another important feature of the front door is a toggle-lock latching mechanism that applies substantially uniform sealing pressure of the door gasket around the complete periphery of the door. The toggle lock mechanism applies closing force near the vertical center of the door rather than a lateral edge of the door as with most furnaces.

The front door assembly 24 of this invention is best seen in FIGS. 5–7. The assembly is a double wall construction including a sheet metal door divider 50 having a top and bottom re-entry flanges 52, 54 as seen cross-section and a door shell 56 which have re-entry flanges 58,60 on opposite vertical edges. The vertical wall of divider 50 is spaced from the vertical wall of shell 56 to provide a vertical passageway 51 therebetween. The divider 50 has a center opening 62 toward the bottom of the divider and draft opening frame 63 welded to the inside of the divider to provide a draft opening when insulation is applied against the inside surface of the divider around the draft opening frame as is seen in FIG. 9. The space between the divider 50 and the shell 56 is closed on both lateral edges of the door by the flanges 58, 60 on the shell 56 but is open at both the top and bottom of the door for fresh air to flow into and through the space or passageway 51 and into the draft opening 62 in the door. The shell 56 has a rectangular opening 57 through it for mounting a solenoid and name plate on the door 24.

FIGS. 8, 9 and 10 are similar to FIGS. 5, 6 and 7 except FIGS. 8, 9 and 10 further show a hinge assembly 32, toggle latch locking mechanism 64 and damper assembly 66 and solenoid 67 on the door 24. The hinge assembly 32 includes a hinge web 68 welded to the flange 60 on the door shell 56 and projecting laterally from the door for attachment to the front wall of the furnace. The hinge assembly 32 further has a hinge pipe 70 for receiving a hinge pin 72 which is secured to the front wall of the furnace 10, by welding or otherwise securing it by hinge brackets 69 as is well known in the art. Its important that hinge pipe 70 is spaced from the lateral edge of the door by the hinge web 68 to provide a limited degree of flexibility to the hinge connection as will be explained.

Figure 11:
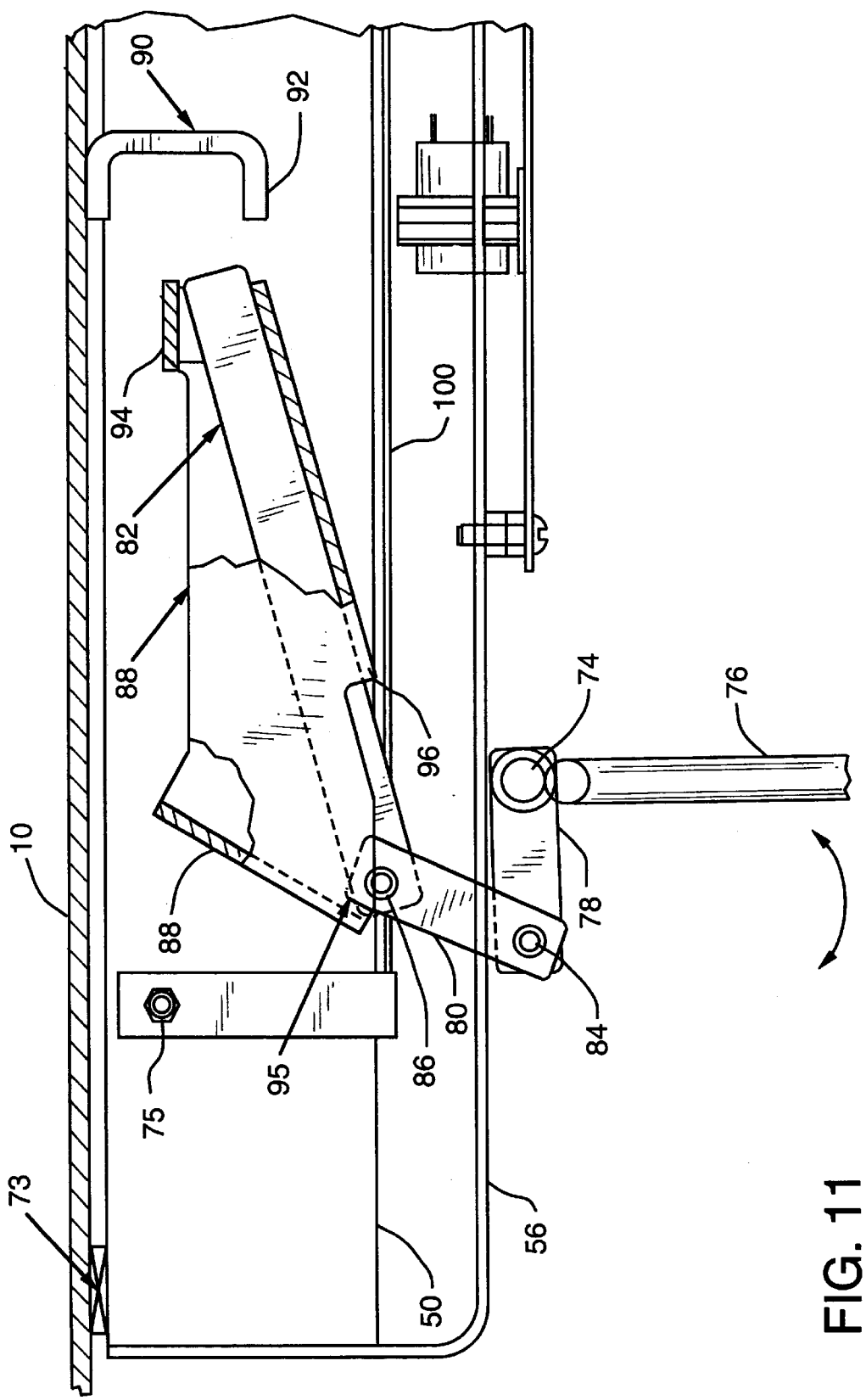
FIG. 11 is an enlarged top plan similar to FIG. 7 and showing the door latch in unlocked position.

The toggle-latch locking mechanism (latch assembly) includes a pivot rod 74, a door handle arm 76 welded to the pivot rod, top and bottom toggle arms 78, 79, upper and lower toggle straps 80, 81 and upper and lower locking arms 82, 83. The ends of the pivot rod 74 are pivotably disposed in pivot pipes 71 welded or otherwise fixedly secured to the outer surface of the shell 56 of the door so the pivot rod can turn or pivot in the pivot pipes on the door. The toggle arms 78,79, toggle straps 80,81, and locking arms 82,83 are pivotally connected through toggle pivot pins 84, 85, 86, 87 and the toggle arms 80, 82 are welded or otherwise fixedly connected to the ends of the pivot rod 74 to create the locking assembly. The door assembly 24 has upper and lower housings 88, 89 fixedly (preferably welded to on the top and bottom of the door to receive the locking arms 82, 83, and upper and lower latch U-hooks 90, 91 are secured (preferably welded) on the front of the furnace above and below the door to receiving one end of each of the locking arms 82, 83. The locking arms 82, 83 are confined within by the upper and lower housings 88, 89 by confinement points or interference points 94, 95, 96 as best seen in FIG. 11. The locking arms are limited to approximately 15° of rotation and sliding movement longitudinally within the housings 88, 89. The limited rotation of the locking arms stops the rotation of the handle 76 so the handle can be used to open and close the door. It would be difficult to control the door with the handle if rotation were not restricted.

FIGS. 8, 9 and 10 show the latch mechanism 64 in locked position and FIG. 11 shows it in unlocked position. As seen in FIG. 10, the upper locking arm 82 has one end thereof locked under hook or a flange 92 on latch U-hook 90 and the other end confined inside of housing 88. The door handle arm 76 is rotated toward the front face of the furnace and is disposed parallel to the front of the door. The pivot rod 74 and pivot pipes 71 pull outwardly on the front face of the outer shell 56 of the door by the clockwise rotation of locking arm 82 (compare with FIG. 11) when the pivot rod 74 and toggle arm 78 are rotated clockwise by the door handle arm 76. The outer shell 56 of the door is flexible sheet metal and acts as a spring, to accommodate manufacturing and gasket variability, by flexing outwardly (bowing) when the pivot rod 74 pulls against the shell. It is important that the toggle-latch mechanism 64 applies closing force against the door in a center portion (side-to-side) and along substantially the full height of the door to apply substantially uniform sealing pressure around the full perimeter of the door as permitted in part by the nature of the hinge connection as described above. Door gasket 73 provides a seal between the front door 24 and the end wall of the furnace 10 against air flow around the door and into the fire box 18.

FIG. 11 shows the latch assembly 64 in unlocked position wherein the door handle toggle arm 78 and toggle strap 80 have been rotated counterclockwise. The locking arm 82 has also moved longitudinally within the housing 88 and retained in the housing by the confinement points 94, 95, 96. The door can now be swung open because the inner end of locking arm 82 is not engaged under flange 92 on latch hook 90. The latch assembly is held on the door by the confinement of the locking arm 82 within the housing 88 and it is not pinned, welded or otherwise connected to the door.

FIGS. 9, 12 and 13 show the damper assembly 66, which is a special feature of this invention. The damper assembly includes generally flat damper 100 which is made of sheet metal, damper swing straps 102, 103 for mounting this damper 100 on the front door 24 and damper pull strap 101 for operating the damper. The damper pull strap 101 preferably comprises a strip of sheet metal having a half twist 105 in it between its ends to provide flexibility to the strap in all lateral directions. The bottom of the pull strap 101 is secured flush against the face of the damper 100, and the top end is adapted to be attached to a solenoid 67 (FIG. 9) that will move the strap vertically and cause the damper to move inwardly and outwardly as permitted by pivoting of the swing straps 102, 103 as permitted by loosely fitting screws 75 on the top of the door.

FIGS. 8, 9 10 and 11 show the damper assembly mounted on the front door 24. The top ends of the swing straps are loosely secured to the top of the door with screws 75, and the top end of the pull strap 101 is connected to a solenoid 67. The damper 100 is positioned to open and close the inlet opening 62 through the door to regulate air flow therethrough. The damper plate 100 may optionally have one or more slots and bendable tabs along an edge thereof for admitting a limited (small) amount of air into the furnace even when the damper is closed so a fire in the fire box 18 will not be completely extinguished as long as fuel remains in the fire box.

The solenoid 67 can be an electrically operated in response to a signal from a conventional thermostat or an optional hydro-thermostat as described below. The solenoid 67 may be connected to a remotely located thermostat and operate with changes in temperature in the furnace or with changes in the temperature in the building or device which is heated by the furnace. With such changes in temperature, a thermostat at the remote location will send a signal to the solenoid 67 to either pull the pull strap 101 upwardly to open the damper or lower the strap to close the damper against the fresh air inlet in the door. The solenoid 67 shown in FIGS. 8, 9 and 10 is mounted on the inside of the name plate 34 on the door and is connected by means not shown to a temperature sensing thermostat on the furnace (preferably on the water box) and has an electrical connection, not shown, to power the solenoid. The name plate 34 acts as a heat radiator for the solenoid to keep it reasonably cool.

FIG. 2 shows the rear of a furnace 10 of this invention, and FIGS. 14–18 show a rear door assembly to close the rear access opening into the flue box 20. As seen in FIG. 2, the access into the flue box 20 provides access to the inside of the flue pipes 22 and the flue pipe 40. The access opening preferably has a rectangular frame 140 around it in which the door assembly 26 is positioned and secured as described below. The rear door assembly 26 comprises a sheet metal shell 108 having cement insulation 109 in the shell and a handle assembly 107 which rotates around the outside face of the door as best seen in FIG. 17. The handle assembly 107 comprises a rod 104 and a handle 106 welded on the rod. To secure the door on the furnace, the ends of the rod 104 are inserted through holes 141 in opposite sides of the frame 140, and the handle 106 is rotated downwardly as seen in FIG. 17. The inner end of the handle 106 presses against the outer face of shell 108 to press the door against the furnace so the door fits flush against the exterior face of the furnace end wall around the access opening. A sheet metal handle 111 may also be provided for convenience in gripping the door, and a gasket, not shown, may be provided to seal the door against the exterior surface of the furnace.

FIGS. 18–22 show an alternative thermostat 110 that can be used with a furnace of this invention. This thermostat 110 is a hydro- or water-operated thermostat which operates without electrical power. It is therefore suited for use in remote areas where electricity is not readily available or by certain religious sects that do not use electrical power.

Thermostat 110 is preferably positioned in the water box 152 of the furnace 150 adjacent to (preferably above) the fire box 154, but may be at alternative locations in the furnace. The thermostat 110 comprises a cylindrical conduit or pipe 112 having a one-way diaphragm 114 on one end and a two-way diaphragm 116 on the other end. An end cap 118 is mounted on the end of the tube 112 over the one-way diaphragm 114. The end cap 118 has a vent hole 119 in it for water in the water box to pass through and press against the diaphragm 114. The diaphragms 114 and 116 are preferably made of neoprene or other elastomer material suitable for use in high temperature environments. The two-way diaphragm has a plunger 120 mounted centrally in it and projecting outwardly from the tube 112 to operate a damper strap 122 as will be described below. The plunger 120 preferably includes threaded means for adjusting its projection from the thermostat by screwing the plunger in and out of an adjusting stud 121.

The thermostat 110 further has a burp valve plate 124 as shown in FIGS. 19 and 20 disposed on the end of the tube 112 and a burp screw 126 mounted on the furnace wall above the conduit and positioned against the outer face of the burp valve plate 124 over a burp hole through the wall of the water box 150. As best seen in FIGS. 19 and 20, the burp valve plate 124 is like a round leaf spring with an open center and a crescent-shaped spring member 128 connected to an annular ring portion 130 at hinge points 132. FIG. 20 shows the plate 124 in a free state before assembly on the thermostat. The spring member 128 projects at an angle to the annular ring portion 130 when the plate is in the free state as seen in that Figure. The burp valve plate 124 is seen in cross section in FIGS. 18, 21 and 22 in the thermostat assembly.

Figure 18:
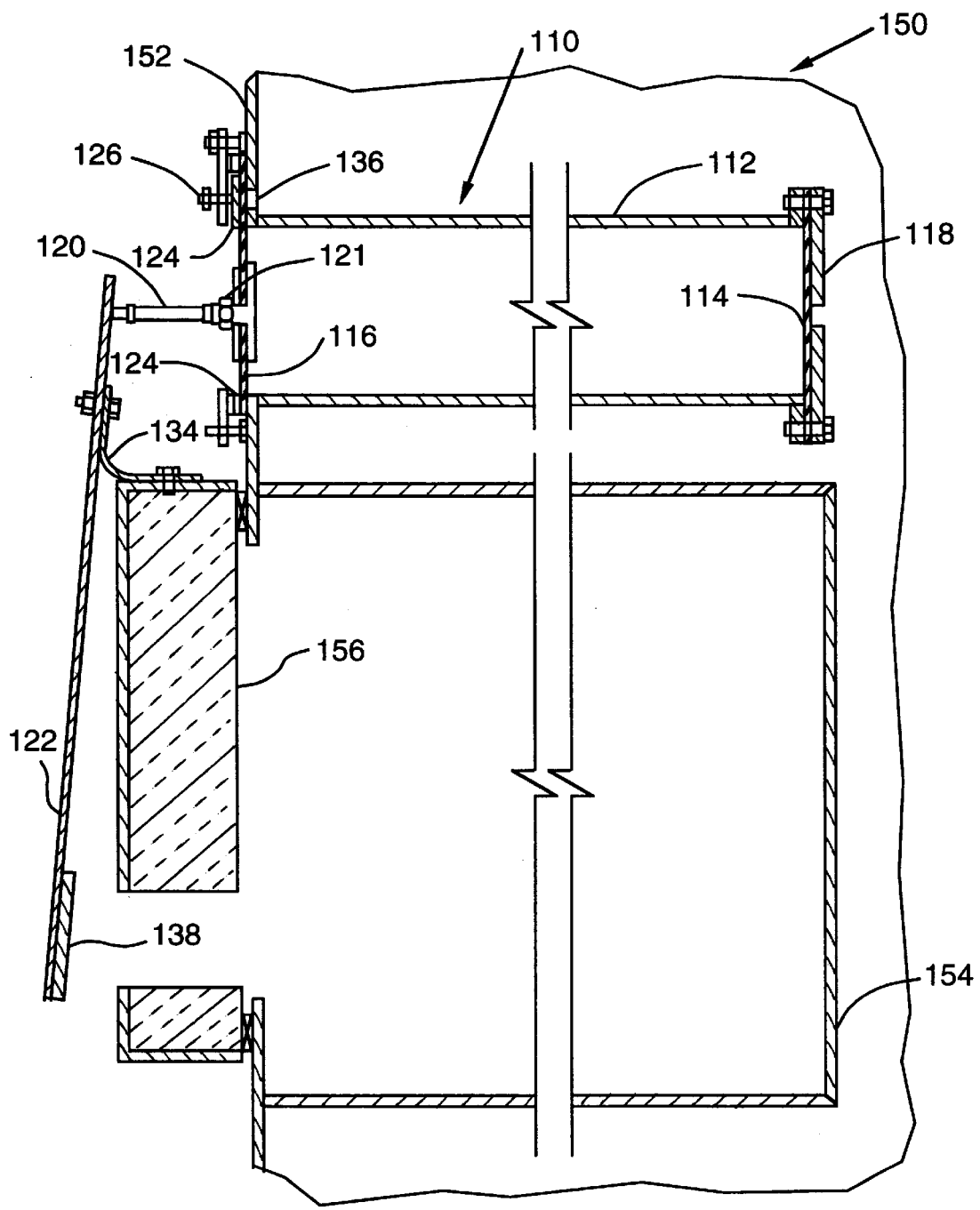
FIG. 18 is a vertical cross-section through an alternative thermostat for a furnace of this invention.
Figure 21:
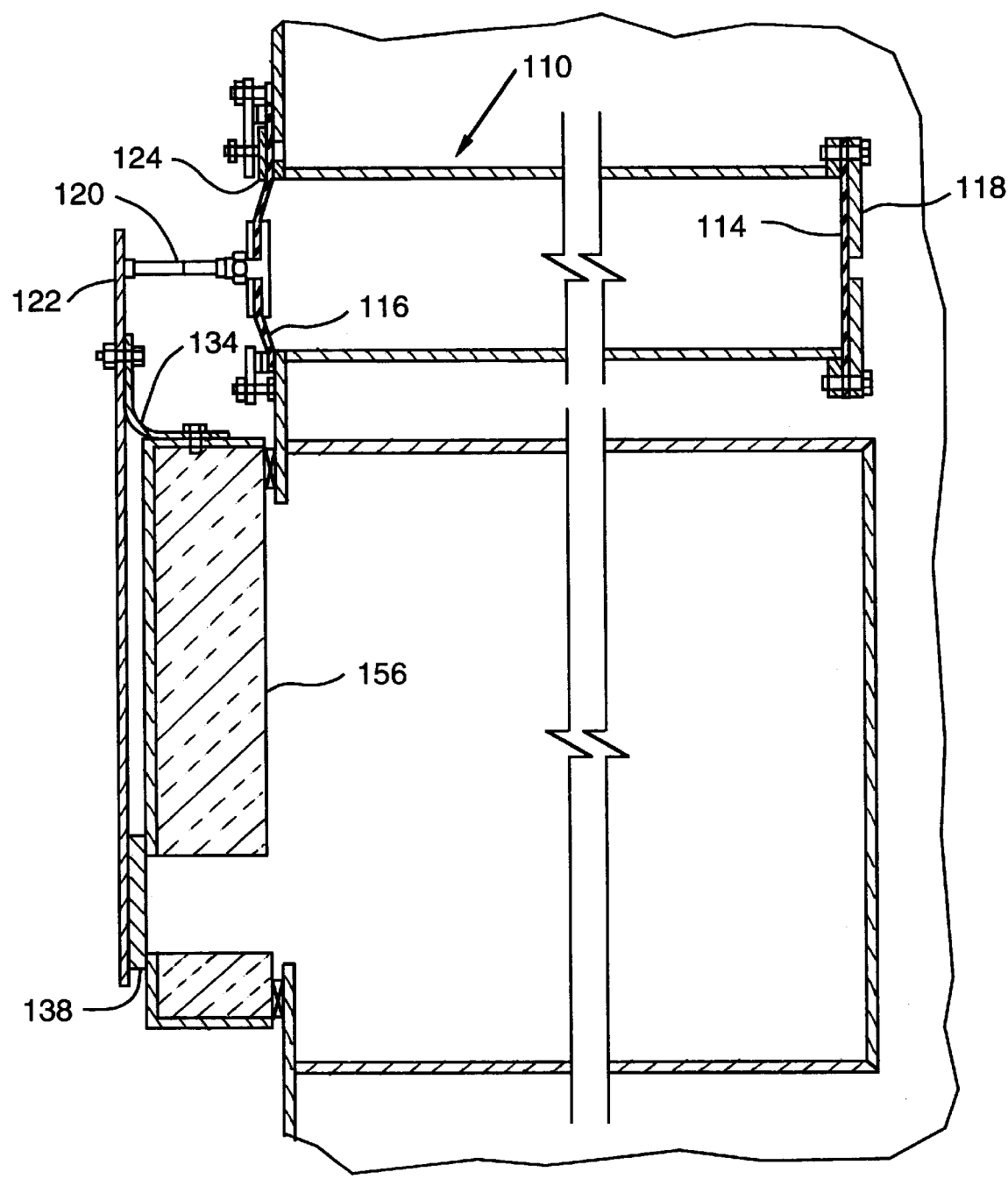
FIG. 21 is a vertical cross-section similar to FIG. 18 and showing the thermostat in the hot mode with the damper on the furnace in the closed position.

The hydro thermostat 110 is adapted to be used with a modified damper assembly in which the pull strap 122 is mounted on the top of the front door 156 by a leaf spring 134 which holds the damper open as seen in FIG. 18. As seen in that Figure, the thermostat plunger 120 is not fully extended. This shows the operating mode in which air is desired for maintaining combustion in the furnace and thereby maintaining heat output. As shown in FIG. 18, the plunger rod 120 and damper have been adjusted as will be explained below. FIG. 21 shows the thermostat in the hot mode with the plunger 120 in contact with the pull strap 122 to close the damper 138 and stop, or substantially stop, the air flow into the furnace.

Adjustment of the hydro thermostat for operation will now be described. Upon installation of the thermostat, the water box 150 is filled with water to the proper height above the hydro thermostat 110. The burp screw 126 is then backed off manually which allows the crescent-shaped leaf 128 of the plate 124 to follow the screw out. Water, as a result of gravity, flows through the burp hole 136 and fills the pipe 112. Water is prevented from leaking to the outside as a result of the burp valve plate 124 forming a complete circular seal against the outer surface of the two-way diaphragm 116 around the hole in the furnace wall. After the pipe 112 is filled, a fire is started in the fire box 154 to raise the water to the desired temperature. When the water reaches the desired temperature, the burp hole 136 is sealed shut by manually tightening the burp screw 126. The plunger 120 projection and the damper 138 are then set to their desired positions, and the system is set for operation, i.e., regulating the temperature through the expansion and contraction of the water inside the pipe 112.

It can be seen that once the load from the leaf spring 134 and plunger arm 120 is brought to bear against the adjusting stud 121, the pressure inside the pipe 112 will be raised slightly and will force the one-way diaphragm 114 back against the end cap 118. As long as the pressure inside the pipe 112 is greater than the static pressure produced by the water head (height), the one-way diaphragm 114 will always rest against the end cap 118.

It is desirable to control the temperature of water in a furnace to within plus or minus 5° of a desired operating temperature, such as 180° F., which is possible with the thermostat 110. The amount of plunger 120 movement in the thermostat 110 responsive to changes in temperature of the water in the furnace is determined primarily by the inside diameter of the furnace wall/burp valve. This dimension can be established to provide the desired preciseness of temperature control.

It should be pointed out that the sensitivity of the temperature control mechanism, i.e., the movement of the plunger 120, can be increased by decreasing the hole through the furnace wall and the corresponding hole through the burp valve, in conjunction with a smaller diameter on the plunger plates. With the one-way diaphragm 114 resting against the end cap 118 as described above and shown in FIG. 18, it can be seen that by incorporating this feature, it is possible to control the temperature to a point approaching a steady state burn rate, which is a very desirable condition.

The importance of the one-way diaphragm 114 as opposed to a solid end cap is revealed when the water temperature falls below the set point. When the fire burns out, the water can cool down considerably below the set temperature. The reduction in temperature (sometimes as much as 80 to 100 degrees) will cause the water inside the unit to shrink considerably. FIG. 22 (cold mode) shows how the one-way diaphragm 114 accommodates most of the shrinkage of the water, thereby relieving the stress on the two-way diaphragm 116 or sucking in more water or air, both of which will upset the calibration of the unit.

Referring to FIG. 21, it is noted that the thermostat 110 is designed to accommodate "temperature overshoot" by the plunger 120 outwardly beyond the closed position of the damper. This accommodation is possible due to the flexing of the leaf spring 134 and the damper strap 122 outwardly beyond that shown in FIG. 21 without in any way damaging the thermostat or damper. However, it should be noted that there should be little, if any, reason for such an overshoot to occur since one of the advantages of this system is the gradual or progressive opening and closing of the damper.

One of the disadvantages of most, if not all, prior art systems is that the damper in those systems is always either completely open or completely closed. They have no way to "gradually" open up the draft damper when the furnace needs heat or "gradually" shut down the draft when the furnace is approaching the desired temperature. This characteristics causes you to have a roaring fire up to a certain point and then it is completely shut down. This complete and sudden shutdown causes the system to smolder in an oxygen starved environment which results in excess creosote build up and an inefficient burning process.

In contrast with such complete shutdowns and openings, the "hydro thermostat" of this invention gradually opens up and closes to control the amount of fire needed to maintain the proper temperature. In other words, the hydro thermostat has the ability to keep the combustion running at a "steady state" condition. A steady state combustion process for a system like this is highly desirable from the standpoint of fuel efficiency and minimal creosote build-up.

It is therefore seen that this invention provides an improved outside wood-burning furnace that has superior performance, convenience, appearance and reliability. The furnace is also well suited to being manufactured by modern manufacturing methods at reasonable cost. The furnace is also safe and convenient.

It will be apparent to those skilled in the art that the preferred embodiment of the furnace, which has been illustrated and described, can be modified in numerous ways without departing from the spirit of the invention or the scope of the claims appended hereto.

What is claimed is:

1. An furnace for combustion of wood a other combustibles comprising:

a water box for containing water to be heated by the furnace;

a fire box disposed within said water box with a fire door opening in the fire box;

an air inlet means for air flow into said fire box to support combustion in the fire box;

at least one flue for exhausting hot combustion gases from the fire box;

a door for closing said fire door opening and for providing access to the inside of the fire box, said door having an inner wall for closing against said fire door opening and an outer wall spaced from said inner wall and forming an air passageway between said inner and outer walls, said inner wall having an inner wall opening through it into said fire box, and said door having at least one inlet into said passageway with said inlet offset from said inner wall opening into the fire box in the general plane of the door so ambient air flowing into said furnace flows into said inlet, through said passageway, and through said inner wall opening into said fire box; and a damper in said passageway at said inner wall opening into said fire box for controlling air flow into said fire box.

2. A furnace as set forth in claim 1 that also includes at least one fire tube extending generally horizontally through said fire box and opens at least one end thereof into said water box.

3. A furnace as set forth in claim 2 that also includes a plurality of fire tubes which open at both ends thereof into said water box.

4. A furnace as set forth in claim 1 such that said door to the fire box is connected to the furnace at a hinge spaced laterally of the door and said door has a toggle locking mechanism which applies substantially uniform sealing pressure of the door against the fire box around the periphery of the door.

5. A furnace as set forth in claim 4 such that said toggle locking mechanism has a vertical axis of rotation and said outer wall of said door is flexible between side edges of said outer wall and acts as a spring member for said toggle locking mechanism.

6. A furnace as set forth in claim 1 also including a flue box having an exhaust outlet and an exterior door for providing access into said flue box.

7. A furnace as set forth in claim 6 such that said at least one flue is inside said water box and connects said fire box to said flue box for passage of hot combustion gases through said firebox, said at least one flue, and said flue box.

8. A furnace as set forth in claim 7 such that said at least one flue extends for most of the length of said water box and is inclined slightly upward from horizontal toward said flue box.

9. A furnace as set forth in claim 8 wherein said at least one flue is at least two flues.

10. An furnace for combustion of wood and other combustibles to heat a fluid conducted to a remotely located heat transfer device, said furnace comprising:

a water box for containing water to be heated by the furnace;

a fire box disposed within said water box;

a door to said fire box for providing access to the inside of the fire box, said door having inner and outer walls with an air passageway between said walls;

a flue box having an exhaust outlet and an exterior door for providing access into said flue box;

at least one flue connecting said fire box to said flue box and extending generally horizontally through said water box for passage of hot combustion gases therethrough;

a plurality of fire tubes extending generally horizontally through said fire box, said tubes being open on both ends thereof into said water box for water in the water box to fill said fire tubes;

at least one air inlet into said air passageway adjacent an edge of said door and an inner wall opening into said fire box inwardly of the edges of said door for air to flow through said passageway and into said fire box to support combustion in the fire box; and a damper in said passageway at said inner wall opening for controlling air flow into said fire box.

11. A furnace for combustion of wood and other combustibles comprising:

a water box for containing water to be heated by the furnace;

a fire box disposed within said water box;

a door to said fire box for providing access to the inside of the fire box, said door having an inner wall and a flexible outer wall spaced from said inner wall and joined to said inner wall along vertical side edges of said inner wall;

an outlet for exhaust of combustion gases from said fire box;

an inner wall opening in said inner wall for air flow into said fire box to support combustion in the fire box, and said door to the fire box is connected to the furnace at a hinge spaced laterally of the door and said door has a toggle locking mechanism which applies substantially uniform sealing pressure of the door against the fire box around the periphery of the door; and a damper device between said inner and outer wall of said door at said inner wall opening to control air flow through said inner wall opening, said damper device comprising a damper plate pivotally mounted on said door to the fire box and a damper pull strap for connection to a temperature sensitive actuating means for moving said pull strap to open and close said damper in response to temperature changes.

12. A furnace as set forth in claim 11 such that said inner wall and said flexible outer wall define a passageway between said inner wall and said flexible outer wall for airflow through the passageway before the air enters the fire box through said inner wall opening, and said toggle locking mechanism pulls outwardly on said flexible outer wall in the closed and locked position of the door and flexes said outer wall so the outer wall acts as a spring.

13. A furnace as set forth in claim 11 such that said temperature sensitive actuating means comprises a hydro-thermostat that is operated by changes in the volume of a reservoir of water caused by changes in the temperature of the water in said water box.

14. In a furnace for combustion of wood and other combustibles which has a water box, a fire box, a flue for exhaust of gaseous products of combustion, an inlet for air into the fire box and a damper for controlling air flow through said inlet, the improvement comprising a thermostat for actuating said damper hydraulically, said thermostat including a container of water in said water box in the furnace, said container of water having a diaphragm in one wall thereof responsive to changes in the volume of a quantity of water in the container, and said diaphragm is connected to said damper for operating said damper in response to changes in the volume of water in said container.

15. A furnace as set forth in claim 1 such that said at least one inlet into said passageway is adjacent the bottom of said door.

16. A furnace as set forth in claim 15 which further includes an inlet into said passageway at the top of said door.

17. A furnace as set forth in claim 5 such that said outer wall is secured to said inner wall along the vertical side edges of said inner wall so that said outer wall can flex inwardly and outwardly between said vertical side edges.

18. A furnace as set forth in claim 13 such that said hydro-thermostat comprises a pipe disposed inside said water box and said pipe has a diaphragm at each end of said piper and a burp valve adjacent the diaphragm for water to flow between the box and said pipe for filling the pipe.

19. An furnace for combustion of wood and other combustibles comprising:

a water box for containing water to be heated by the furnace;

a fire box disposed within said water box with a fire door opening in the fire box;

an air inlet means for air flow into said fire box to support combustion in the fire box;

at least one flue for exhausting hot combustion gases from the fire box; and a door for closing said fire door opening and for providing access to the inside of the fire box, said door having an inner wall for closing against said fire door opening and an outer wall spaced from said inner wall and forming an air passageway between said inner and outer walls, said inner wall having an inner wall opening through it into said fire box, said door having at least one inlet into said passageway with said inlet offset from said inner wall opening into the fire box in the general plane of the door so ambient air flowing into said furnace flows into said inlet, through said passageway, and through said inner wall opening into said fire box, said door is connected to the furnace at a hinge spaced laterally of the door and said door has a toggle locking mechanism with a vertical axis of rotation which applies substantially uniform sealing pressure of the door against the fire box around the periphery of the door, and said outer wall of said door is flexible between side edges of said outer wall and acts as a spring member for said toggle locking mechanism.

* * * * *

UNITED STATES PATENT AND TRADEMARK OFFICE
CERTIFICATE OF CORRECTION

PATENT NO. : 6,029,648  
DATED : February 29, 2000  
INVENTOR(S) : W. Coy Willis Page 1 of 1

It is certified that error appears in the above-identified patent and that said Letters Patent is hereby corrected as shown below:

<u>Column 5,</u>
Line 19, "16" should read -- 18 --.

<u>Column 6,</u>
Line 44, add spaces between -- 78, 79 --, -- 80, 81 --, and -- 82, 83 --.

<u>Column 10,</u>
Line 47, "An" should read -- A --.
Line 47, "a" should read -- and --.

<u>Column 11,</u>
Line 36, remove "at least".
Line 37, "An" should read -- A --.

<u>Column 12,</u>
Line 62, "piper" should read -- pipe --.
Line 63, after "between the", insert -- water --.
Line 64, "An" should read -- A --.

Signed and Sealed this

Twenty-sixth Day of February, 2002

Attest:

JAMES E. ROGAN
*Attesting Officer*     *Director of the United States Patent and Trademark Office*